United States Patent
Bangalore et al.

(10) Patent No.: US 7,580,842 B1
(45) Date of Patent: *Aug. 25, 2009

(54) SYSTEM AND METHOD OF PROVIDING A SPOKEN DIALOG INTERFACE TO A WEBSITE

(75) Inventors: Srinivas Bangalore, Morristown, NJ (US); Junlan Feng, Basking Ridge, NJ (US); Mazin G. Rahim, Warren, NJ (US)

(73) Assignee: AT&T Intellectual Property II, LP., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,886

(22) Filed: Oct. 30, 2007

Related U.S. Application Data

(62) Division of application No. 10/740,186, filed on Dec. 18, 2003, now Pat. No. 7,373,300.

(60) Provisional application No. 60/434,257, filed on Dec. 18, 2002.

(51) Int. Cl.
*G10L 15/22* (2006.01)
*G10L 13/08* (2006.01)
*G10L 15/18* (2006.01)

(52) U.S. Cl. ............ 704/270.1; 704/275; 704/260; 704/257

(58) Field of Classification Search ............ None
See application file for complete search history.

(56) References Cited

U.S. PATENT DOCUMENTS

| | | | |
|---|---|---|---|
| 6,604,075 | B1 | 8/2003 | Brown et al. |
| 7,231,395 | B2 | 6/2007 | Fain et al. |
| 2002/0010586 | A1 | 1/2002 | Ito et al. |
| 2002/0010715 | A1 | 1/2002 | Chinn et al. |
| 2002/0032564 | A1* | 3/2002 | Ehsani et al. ............ 704/235 |
| 2002/0128821 | A1* | 9/2002 | Ehsani et al. ............ 704/10 |
| 2002/0164000 | A1 | 11/2002 | Cohen et al. |
| 2003/0093428 | A1 | 5/2003 | Suzumori et al. |
| 2003/0115289 | A1 | 6/2003 | Chinn et al. |
| 2003/0182124 | A1 | 9/2003 | Khan |
| 2004/0205614 | A1 | 10/2004 | Keswa |

OTHER PUBLICATIONS

Egbert Ammicht et al. "Knowledge collection for natural language spoken dialog systems", EUROSPEECH 1999.*

Nicolas Roussel, Oliver Hitz and Rolf Ingold, "Web-based Cooperative Document Understanding", ICDAR 2001.

Susan Dumais, Michele Banko, Eric Brill, Jimmy Lin, Andrew Ng, 'Web Question Answering : Is More Always Better ?', SIGIR'02, Aug. 11-15, 2002, Tampere, Finland, pp. 291-298.

David Pinto, Michael Branstain, Ryan Coleman, W. Bruce Croft, Matthew King, "QuASM: A System for Question Answering Using Semi-Structured Data", JCDL '02, Jul. 13-17, 2002 Portland, Oregon, USA.

(Continued)

*Primary Examiner*—Talivaldis Ivars Smits

(57) ABSTRACT

Disclosed is a system and method for generating a spoken dialog service from website data. Spoken dialog components typically include an automatic speech recognition module, a language understanding module, a dialog management module, a language generation module and a text-to-speech module. These components are capable of being automatically trained from processed website data. A website analyzer converts a website into structured text data set and a structured task knowledge base. The website analyzer further extracts linguistic items from the website data. The dialog components are automatically trained from the structured text data set, structured task knowledge base and linguistic items.

17 Claims, 4 Drawing Sheets

OTHER PUBLICATIONS

Eric J. Glover, Kostas Tsioutsiouliklis, Steve Lawrence, David M. Pennock, Gary W. Flake, "Using Web Structure for Classifying and Describing Web Pages", WWW2002, May 7-11, 2002 Honolulu, Hawaii, USA pp. 562-569.

Craig A. Knoblock, Steven Minton, Jos'e Luis Ambite, Maria Muslea, Jean Oh, Martin Frank, "Mixed-Initiative, Multi-Source Information Assistants", WWW2001, May 1-5, 2001, Hong Kong, pp. 697-707.

http://www.internetspeech.com/, industry white paper, printed Dec. 2003.

William W. Cohen, Matthew Hurst, Lee S. Jensen, "A Flexible Learning System for Wrapping Tables and Lists in HTML Documents", WWW2002, May 7-11, 2002, Honolulu, Hawaii, USA, pp. 232-241.

A.F.R. Rahman, H. Alam, R. Hartono and K. Ariyoshi, Automatic Summarization of Web Content to Smaller Display Devices, ICDAR2001.

http://www.w3.org/XML/.

Mashiro Araki, Tasuku Ono, Kiyoshi Usad, Tasuhisa Nhmi, "An Automatic Dialogue System Generator from the Internet Information Contents", Eurospeech 2001.

Xiaoli Li, Bing Liu, Tong-Heng Phang, and Minqing Hu, "Web Search Based on Micro Information Units", WWW2002.

Gerald Penn, Jianying Hu, Hengbin Iuo, Ryan McDonald, Flexible Web document Analysis for Delivery to Narrow bandwidth Devices, ICDAR2001.

B. Chidlovskii, "Wrapper generation by k-reversible grammar induction", In the proceedings of the Workshop on Machine Learning and Information Extraction, Berlin, Germany, 2000.

I. Muslea, S. Minton, and C. Knoblock. "Wrapper induction for semi structured information sources", Journal of Autonomous Agents and Multi-Agent Systems, 16(2), 1999.

Mindfabric, Technology Whitepaper, printed Dec. 17, 2003 from www.mindfabric.com.

Webcontent printed from www.iphrase.com Dec. 17, 2003.

Egbert Ammicht et al., "Knowledge collection for natural language spoken dialog systems," EUROSPEECH 1999.

* cited by examiner

FIG. 5

1. *WebTalk:* Hi, this is at&t local services. How may I help you?
   *User:* Hi.
2. *WebTalk:* Hi, how may I help you?
   *User:* What can I say?
3. *WebTalk:* I can tell you about products & services, solutions, LNP and local data services. How may I help you?
   *User:* What's LNP, please.
4. *WebTalk:* LNP stands for local number portability.
   *User:* Please tell me more about that.
5. *WebTalk:* You can download Handbooks and Guides from our website.
   AT&T Business Services LNP Port Out Guide (PDF, 158Kb)
   AT&T Business Services Local Number Portability Procedures Handbook.pdf (PDF, 500 Kb)
   *User:* Thanks
6. *WebTalk:* You're welcome. Anything else?
   *User:* Ok, tell me about your solutions.
7. *WebTalk:* I can give more information about local solutions, including business communication goals, business profile and business telephone systems. How may I help you?
   *User:* Do you have special solutions for small business customer
8. *WebTalk:* Yes, Whether you use a PBX, key system, computer modem, fax machine, or just plain telephone, AT&T PrimePath provides a full-featured service for all your local telecommunications needs. AT&T PrimePath provides the highest level of service at market competitive rates for small businesses or remote locations.

FIG. 6

| local | |
|---|---|
| | • Help: products & services, solutions, LNP and local data services<br>• home page (1)<br>• local voice service (38) |

| att_difference.html | • at&t local service : the at&t difference<br>• the at&t difference(38) |
|---|---|
| faq.html | • at&t local service : frequently asked questions |
| data_services.html | • at&t local service : local data services<br>• local data services(1) |
| sitemap.html | • at&t local service : sitemap<br>• site map(38) |
| index.html | • at&t local service |

- products
- solutions
- lnp

SYSTEM AND METHOD OF PROVIDING A SPOKEN DIALOG INTERFACE TO A WEBSITE

PRIORITY CLAIM

The present application is a divisional of U.S. patent application Ser. No. 10/740,186 filed on Dec. 18, 2003 now U.S. Pat. No. 7,373,300 which claims priority to U.S. Provisional Patent Application No. 60/434,257 filed Dec. 18, 2002, the contents of which are incorporated herein by reference in their entirety.

RELATED APPLICATIONS

The present application is related to U.S. patent application Ser. No. 10/288,764, the contents of which are incorporated herein by reference.

BACKGROUND OF THE INVENTION

1. Field of the Invention

The present invention relates to spoken dialog systems and more specifically to a system and method of automatically constructing a dialog system for a web site.

2. Background

Spoken dialog systems provide individuals and companies with a cost-effective means of communicating with customers. For example, a spoken dialog system can be deployed as part of a telephone service that enables users to call in and talk with the computer system to receive billing information or other telephone service-related information. In order for the computer system to understand the words spoken by the user, a process of generating data and training recognition grammars is necessary. The resulting grammars generated from the training process enable the spoken dialog system to accurately recognize words spoken within the "domain" that it expects. For example, the telephone service spoken dialog system will expect questions and inquiries about subject matter associated with the user's phone service. Developing such spoken dialog systems is a labor-intensive process that can take many human developers months to complete.

Many companies desire a voice interface with the company website. The prevalent method of creating such a spoken dialog service requires a handcrafted process of using data as well as human knowledge to manually create a task representation model that is further used for the general dialog infrastructure. Several approaches are currently used to create the dialog such as using VoiceXML and handcrafting a spoken dialog system.

The general process of creating a handcrafted spoken dialog service is illustrated in FIG. 1. The process requires a database of information and human task knowledge (102). For example, to provide a voice interface to a website, human interaction is required to review the text of the website and manually assign parameters to the text in order to train the various automatic speech recognition, natural language understanding, dialog management and text-to-speech modules in a spoken dialog system.

A typical spoken dialog system includes the general components or modules illustrated in FIG. 2. The spoken dialog system 200 may operate on a single computing device or on a distributed computer network. The system 200 receives speech sounds from a user 202 and operates to generate a response. The general components of such a system include an automatic speech recognition ("ASR") module 204 that recognizes the words spoken by the user 202. A spoken language understanding ("SLU") module 206 associates a meaning to the words received from the ASR 204. A dialog management ("DM") module 208 manages the dialog by determining an appropriate response to the customer question. Based on the determined action, a spoken language generation ("SLG") module 210 generates the appropriate words to be spoken by the system in response and a Text-to-Speech ("TTS") module 212 synthesizes the speech for the user 202. Data and rules 214 are used to process data in each module.

Returning to FIG. 1, the "domain" related to the subject matter of the website and the modules must be trained in order to provide a spoken dialog that is sufficiently error-free to be acceptable. The handcrafted process results in a task representation model (104) that is then used to generate the dialog infrastructure (106).

As mentioned above, another attempt at providing a voice interface to a website is VoiceXML (Voice Extensible Markup Language). VoiceXML is designed for creating audio dialogs that feature synthesized speech, digitized audio, recognition of spoken and DTMF key input, recording of spoken input, telephony, and mixed-initiative conversations. Its major goal is to bring the advantages of web-based development and content delivery to interactive voice response applications. However, VoiceXML requires programming each user interaction. The VoiceXML programming language suffers from the same difficulties as does the standard method of generating a spoken dialog system in that it is costly to program and costly to keep the voice interface up-to-date as website content changes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an example WebTalk dialog; and

FIG. 6 illustrates the structure of a website.

DETAILED DESCRIPTION OF THE INVENTION

Figure 1:
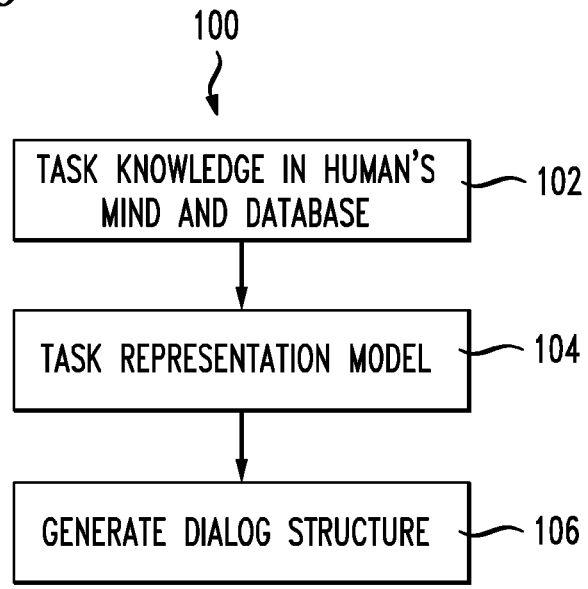
FIG. 1 illustrates a standard method for generating a spoken dialog system.

Spoken dialog applications provide companies with a cost effective means of communicating with customers. Unfortunately, developing these applications involves a great deal of effort in task-specific task collection and design of handcrafted rules for the various components of a dialog system. The cost of developing such systems and maintaining them keep companies from seeking this cost saving service. Currently, most companies have already expended large resources to design their own websites for marketing their products and services and supporting their customers through internet. However, it's still often customers prefer to solve their problems by talking to a real customer representative by phone other than investigating a website to get self-help online services. The present invention brings human-like characteristics to these websites, by which customers can simultaneously enjoy both conveniences of traditional online customer service and talking to a virtual online customer representative, such as freely describing their goals, negotiating their intentions with the system, getting direct information service and completing online transactions by interacting with the website in spoken language.

The present invention differs from most web-based information applications, including voice-enabled web surfing, search engine and web-based question-answering. Compared with voice-enabled web surfing which allows users to invoke hyperlinks by speaking the highlighted text, this invention will allow users to speak naturally and receive intelligent responses. In contrast to search engines that return a set of relevant documents to a user's query and expect the user to scan through these documents to find the final answer, this invention utilizes website understanding to provide direct information as the user requires. Comparing with web-based question-answering which aims to provide a short precise answer to the user's question, this invention will support broader interactive services, such as helping users refine their intentions, finding solutions for users' specific problems and helping users complete online transactions through spoken dialog.

A website is more structured than the web. Hence, a website can be analyzed more deeply than what one can do to the web. Using the knowledge extracted from the website to build natural dialog services and integrating human-machine dialog and web browsers into one interface will cooperatively improve companies' online marketing and services.

Building a spoken dialog application is time consuming, tedious and requires great deal of human knowledge and expertise. It involves significant effort in task-specified data collection and design of handcrafted rules for the various components of a dialog system. In previous work, a great deal of effort has been invested in constructing a core dialog infrastructure which is expected to ease dialog application designers from authoring low-level and task-independent types of interactions. Task-related knowledge is encapsulated in a Task-Representation Model, which works as the interface between the specific task knowledge and the generic dialog architecture. Several task representation models such as object-based model, table-based model and script-based model have become mainstay and have been widely adopted. VoiceXML is a special case of this approach. VoiceXML document can be considered both as a format for specifying the dialog management and for interfacing to the application logic. A VoiceXML interpreter can be considered as the core dialog component. In this framework, application authors are required to carefully define the relationships that exist in the task knowledge and predict all possible dialog states. However, experience has shown that the application logics usually go beyond the scope of the capabilities of a generic dialog infrastructure and task representation model. Even if an optimal generic dialog infrastructure and an efficient task representation model can be found, collecting task-specific data, analyzing and tailoring task data to fit the models still require a great deal of expertise, besides being time-consuming. The present invention seeks to completely automate this process for rapidly creating voice-enabled helpdesk and customer-care services for an organization by leveraging the wealth of information on the organization's websites.

Currently, almost every organization has its own website. In order to have their customers get online information in a timely, effective and efficient way, organizations expend a large amount of resources to organize these sites to be easily manageable. When preparing a website, a great deal of effort is invested in analyzing the background application database, extracting application logics, and carefully designing the dynamic interactions in web environment and the screen presentation to make it more attractive and helpful for the customers. Textual data on the web pertaining to a product or a service has been created to be in a human readable form. The present invention aims to take all these advantages and enable those organizations, which have already set up their websites, to serve their customers through a spoken dialog interface either over a telephone or the Internet.

In general, the present invention is called "Webtalk." This term is not meant to limit the scope of the claims but will be used throughout as a shorthand notation to various aspects and embodiments of the invention. Since WebTalk does not require human intervention for building a dialog application, one can experience a quick turnaround from one application to another. Furthermore, it also enables the customer care applications to be tightly synchronized with changes on the web pages. Webtalk envisions a technique for creating voice-enabled helpdesk services, customer care services, and natural language based Web Navigation. It will provide new opportunities for building complex dialog services and enable more widespread use of speech, natural language (NL), and dialog technologies at a lower cost.

Figure 2:
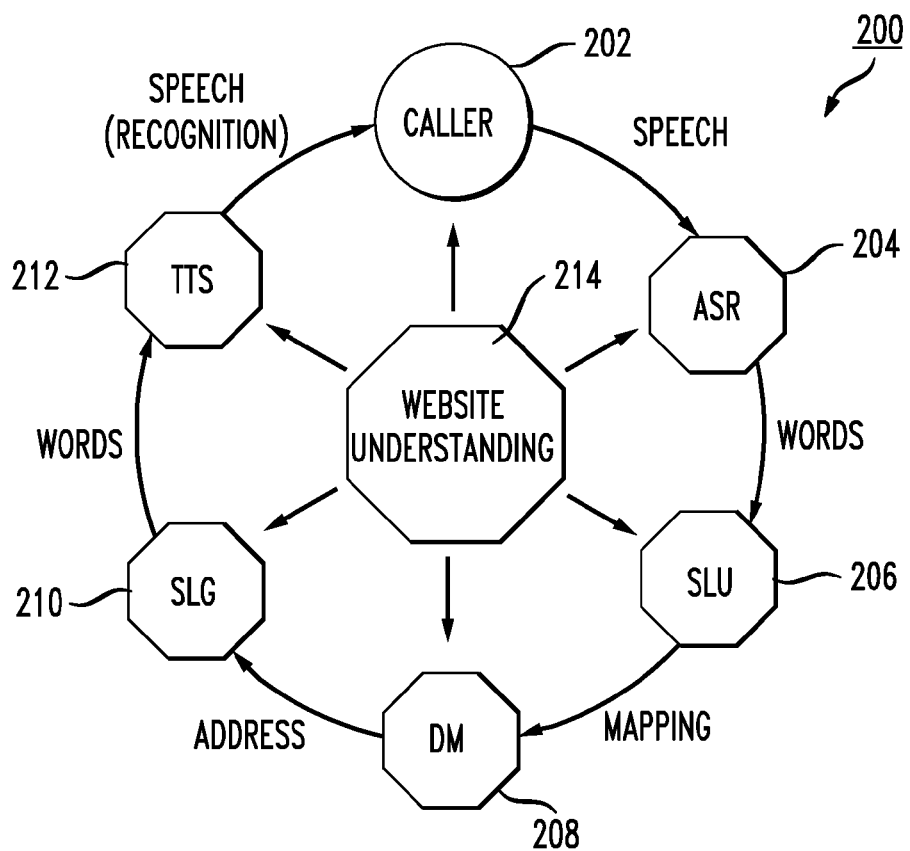
FIG. 2 illustrates the basic components of a spoken dialog system.
Figure 3:
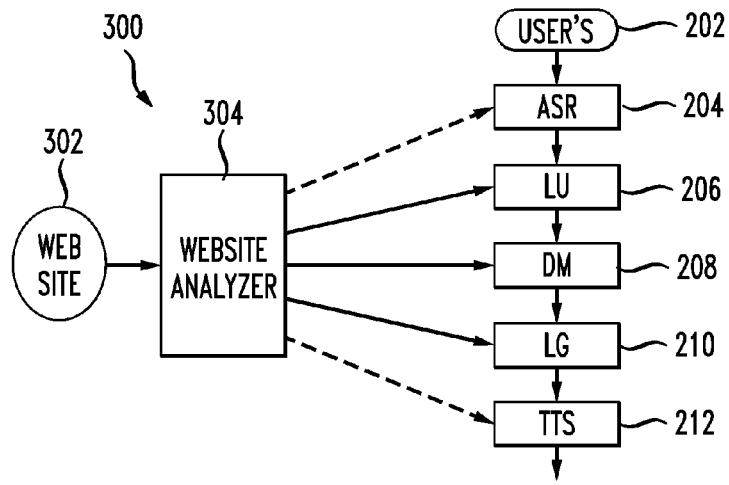
FIG. 3 illustrates the basic architecture for generating a spoken dialog system according to an embodiment of the present invention.
Figure 4:
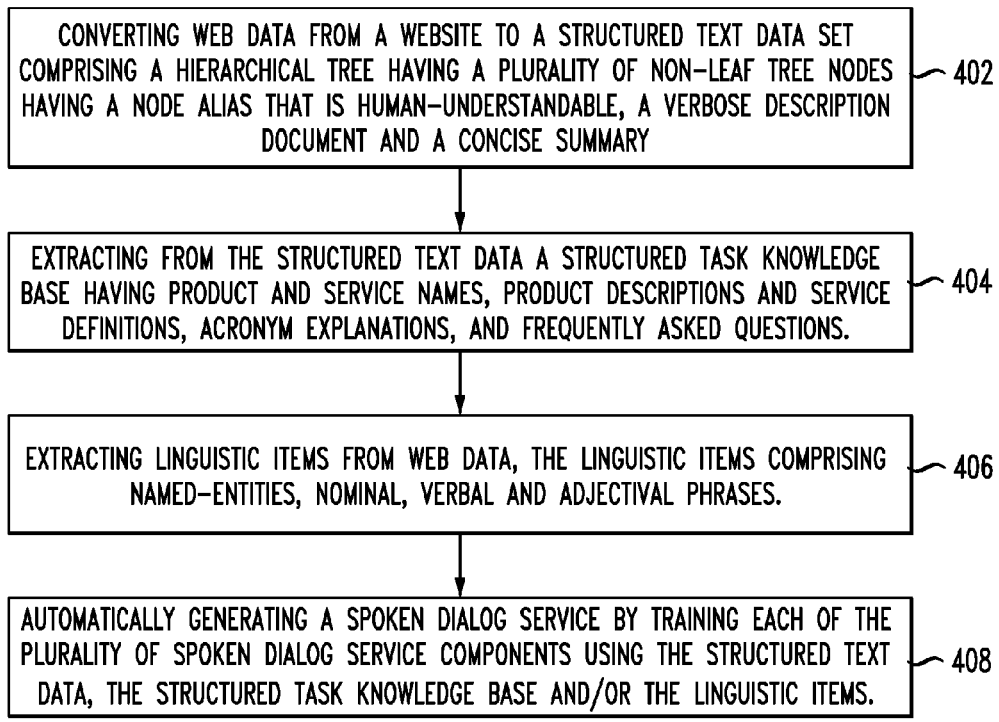
FIG. 4 illustrates a method of automatically generating a spoken dialog service based on website data according to an aspect of the present invention.

In order to achieve such a goal for automatically building spoken systems, one needs to address the research challenges present in WebTalk. As shown in FIG. 2 and FIG. 3, a spoken dialog system consists of five major components: Automatic Speech Recognition (ASR) engine 204 such as AT&T's Watson ASR software, a Spoken Language Understanding (LU) module 206, a Dialog Manager (DM) 208 such as AT&T's Florence DM engine, a Language Generation (LG) module 210, and a Text-To-Speech synthesizer (TTS) 212 such as AT&T's Natural Voices TTS engine.

FIG. 3 shows an additional component in the Website Analyzer 304. The analyzer 304 analyzes a given website including all its files and constructs the task knowledge for the five components 204, 206, 208, 210 and 212. A website does not contain structure dialog-oriented task representations, in-domain real conversation data and in-domain speech data, which are prerequisite for building an application-specific dialog system using our current technologies. Developing a Webtalk application includes constructing language models that reflect human machine-like interaction by using web data, building natural language understanding models that require no hand-editing or annotation, constructing application-specific dialog models based on unstructured and structured task data on websites, designing a language generation component in a manner that can intelligently present that system's knowledge state and building a good quality web-based task-specific speech synthesis component.

Disclosed herein is an exemplary architecture for WebTalk and details regarding a method for automated task information extraction. The following is provided herein: an overview of the main components of WebTalk, a detailed description for understanding websites, including website structure analysis, web document representation, and web document segmentation and information classification.

FIG. 3 shows a simplified architecture of WebTalk with its six major components, namely, the ARS (automatic speech recognition) engine 204, the LU language understanding) module 206, DM (dialog manager) 208, language generation component 210, TTS (text-to speech) synthesizer 212 and Website analyzer 304. This architecture is expected to support complete automation for building spoken dialog systems based on a given customer-care website. Hence each component is required to be automatically trainable based on web data.

The role of Website Analyzer 304 is to translate semi-structured heterogeneous web data on a website to structured task knowledge representations for all the other components. It converts a website to a structured text data set and a structured task knowledge base for the LU 206, LG 210, and DM 208 modules. For building website-specific language models for ASR 204, it extracts a collection of linguistic items such as named-entities, nominal, verbal and adjectival phases.

In one aspect of the invention, a website is recognized into a hierarchical tree that is referred to as a structured text data. A leaf node in the hierarchical tree is a node at the end of a branch of the tree. Other nodes are simply non-leaf nodes. For each non-leaf tree node, the method comprises computing a node alias that is prepared to be human understandable, a verbose description document and a concise summary. This information at a node is used for information matching and helps prompt construction during dialog execution.

Each leaf node of this tree corresponds to a webpage and contains a list of information units (IU). From structured data text, the method comprises extracting structured task data such as product & service definitions, acronym explanation, and frequently asked questions (FAQ's). Any product or service information on a website may be extracted.

The speech recognition module 204 is discussed next. In order to obtain high recognition performance a task-oriented ASR component instead of a task-independent large vocabulary speech decoder component is strongly preferred. A task specific language model needs to be built using only data available on the web. Web pages are typically prepared for humans to read and contain information in descriptive form. It is not necessary to access to any real examples about human-machine interactions to proceed within this task. The challenge is to compensate for the absence of real human-machine dialogs and learn a language model that reflects the characteristics of human machine interactions. The speech recognizer preferably used in WebTalk is XYZ Watson ASR engine. The website-specific language model is built by combining task-related key terms extracted from the given website with generalized language model for help desk conversations.

The language understanding module 206 is traditionally a rule-based component that converts natural language sentences into semantic representations. For a new application, the set of handcrafted rules needs to be rebuilt with special expertise and with sufficient task analysis. However in WebTalk, language understanding is required to work automatically to fit various tasks, based on web data alone. Hence, a data-driven language understanding module generation component is used. The component has the following capabilities: (1) it provides a semantic representation, when users' input is independent of task or can be answered using structured task knowledge; (2) it uses an extended information retrieval (IR) engine and produces a ranked list of relevant passages for responding to the user's request. The extended IR works on a hierarchical tree instead of a flat collection of documents. The tree nodes, webpages and IUs are all indexed. High-level task knowledge such as in-task common terms, webpage creators' intentional emphasis, dialog context and syntactic knowledge are taken as factors during retrieval of information; and (3) the component rejects out-of-task requests.

The dialog manager 208 is the core of a dialog system and at the same time a component which currently involves the most handcrafted work including predicting all possible dialog states and designing associated actions and responses for each state. In order to totally automatically construct this component, the process of converting task knowledge described in web documents into operable dialog models is utilized. The DM 208 takes the output of LU 206 and replies with a natural language answer. The DM 208 performs the following steps: (1) The DM handles task-independent dialog events, including greetings (e.g.: hello, hi, thanks, bye, etc.) and commands to the system (e.g.: restart, repeat, speak slowly please, etc); (2) The DM provides dialog context-based help; (3) The DM summarizes a long answer to a concise one; (4) The DM chooses answers based on dialog context; and (5) the DM dynamically translates intermediate dialog states to VoiceXML.

The language generation module 210 either uses sentence patterns to translate the feedback from DM 208 to spoken natural language or simply reedits the returned passage by replacing or deleting words which are already written in natural language but only are useful for internet browser users.

The TTS synthesizer 212 preferably used in WebTalk is the XYZ TTS system. The present discussion will be limited to the website analyzer module in the rest of the disclosure. FIG. 5 gives a real dialog sample between a user and WebTalk using www.att.com/local as its task knowledge. The first turn is a general system prompt, "Hi, this is YY. How may I help you?" The sentence template is filled in with the term YY generated and automatically extracted from the website. In this regard, the term "at&t local services" may be automatically extracted from the website and inserted into the template for the website name YY.

The second turn is a simple in-disclosure reply for dialog continuity. The third turn includes context-based system help prompt. The forth turn explains an acronym. The fifth gives an answer by referring to the dialog context. The sixth is recognized as a task-independent common dialog event. The seventh reply shows the system's response via language generation. The eighth answer comes from summarizing a matched information unit.

This section presents an aspect of the invention related to extracting task knowledge from a given website, which includes website structure analysis, web document representation, web document segmentation and information classification. The website structure analysis is needed to analyze the structure and content of a website. A website is more structured than the web. Web documents on a website are often organized in a hierarchical physical structure and cross-linked through hyperlinks. Hyperlinks (or citations) are being actively used in web search engine, web crawlers, webpage classification and web-based question answering system. A hyperlink has two components: the destination page and the anchor text describing the link. The belief is that these anchor texts have greater discriminative and descriptive power than the text in the target document itself. In previous approaches the physical structure of the website has not been used as a cue for information extraction. WebTalk treats this structure as a subjective topic classification tree made by task experts.

FIG. 6 shows one part of the structure of www.att.com/local. The top node is 'local'. For each node and each page, its linking relationships with other pages are collected. For instance "at&t differences (38)" means "at&t differences" have been used as anchor texts 38 times for www.att.com/ local/att_difference.html. This analysis is repeated at each level of the website. For each node, a summary is computed as well as a descriptive document and an alias for the node. The descriptive document simply consists of anchor texts of all links pointing to this node. Among them, the best representative and concise anchor text is chosen as the alias for the node. The summary consists of a list of selected anchor texts, which are descriptive words or phrases and could cover important and most of the content of this node. This approach has been tested on various websites. These websites consist of 700 nodes in total, of them 635 get a summary by this approach. For instance, "products and services, solutions, solutions, and local data services" is the summary string of 'local'. This approach was used in the third turn of FIG. 5.

In terms of webpage analysis, extracting salient information from web pages is a challenge among web-based information applications including web-based question answering, web-based Knowledge Assistants, wrapper technology, voice enabled web surfing tools such as (http://www.internetspeech.com/) as well as WebTalk. The development of XML, Voice XML and Semantic Web attempt to provide a uniform representation for addressing these challenges.

An HTML page is designed for rendering a two-dimensional image. Its content is often multilayered and often contains multiple information blocks. The present invention extracts the information units from an HTML page and classifies them to predefined categories in terms of their function and mutual relationships. These information units would be useful in constructing web information class WIC)-based language modes, developing WIC-based dialog modules, and WIC-based language generation. The remaining part of this section presents a feature-vector representation of HTML documents. Based on this representation model, classification techniques are introduced for web document analysis.

The HTML Document Representation is discussed next. In WebTalk, a feature vector representation model is used for HTML documents, which is suitable for computing and stresses the cues that humans often use to understand HTML pages. These cues include document structure features, text visual features, geometric features, behavior features, environment features and content features. Table 1 shows a feature table, which is linear and extracted from HTML source codes. Each row of this table corresponds to a text leaf node or a non-text leaf node of the nested tree of html source codes. Each text node (such as, "Enter", "A", etc) has a linear order in the leftmost cell. Non-text nodes are represented as environment features for contiguous text nodes. All features in this table except "structure code" are textual features. The structure code feature is used to represent table items, since a vast majority of HTML pages are structured using the 'table' tag. A structure code is defined as zero or a concatenation of triples "a.b.c:d.e.f" where 'a' is the physical order of the 'table' that this node resides in, 'b' is the order of 'ti' (tr' represents rows), 'c' is the order of 'td' ('td' represents columns), '.' stands for the concatenation. From this table, we compute two sets of feature vectors for document segmentation and information classification.

TABLE 1

An example feature table

| No | structure node | tag | Parent tags | text | Color | Background color | size | Position | Link | server-logic | Client-logic |
|---|---|---|---|---|---|---|---|---|---|---|---|
|  | 1.1.1 | img |  |  |  |  |  | 0.0 |  |  |  |
|  | 1.1.1 | img |  |  |  |  |  | 0.0 |  |  |  |
| 0 | 1.1.2:1.1.1:1.1.1 | strong | span p | Enter | 0 |  | 4 | 0.0 |  | http://search.att.com/cgi-bin/ake.cgi |  |
| 1 | 1.1.2:1.1.1:1.1.1 | A | strong span p | Search Term | 0 |  | 4 | 0.0 | http://search.att.com/ | ... |  |
| 2 | 1.1.2:1.1.1:1.1.1 | strong | span p | Or | 0 |  | 4 | 0.0 |  | ... |  |
| 3 | 1.1.2:1.1.1:1.1.1 | A | strong span p | at&t Keyword | 0 |  | 4 | 0.0 | /att_keywords/faqs.HTML | ... |  |
| 4 | 1.1.2:1.1.1:1.1.1 | span | p | : | 0 |  | 1 | 0.0 |  | ... |  |
|  | 1.1.2:1.1.1:1.1.2 | input |  |  |  |  |  | 0.0 |  | ... |  |
|  | 1.1.2:1.1.1:1.1.3 | input |  | [Go.] |  |  |  |  |  | ... |  |
| 5 | 1.1.2:1.1.1:1.1.4 | strong | a p | A-Z Index | 0 |  | 4 | 0.3 | /atoz | ... |  |

The HTML Document Segmentation process assumes that each HTML page is a realization of a sequence of information class labels (symbols). The role of webpage understanding is to produce a mapping from feature tables to the underlying symbol sequences. An example list of class labels used is shown in Table 4.

Three problems make this very difficult. First, the mapping from one symbol to HTML realization is not one-to-one. Second, the boundaries between symbols cannot be identified explicitly from the feature table. Third, a major characteristic of webpage analysis is the high dimensionality of the feature space, which makes developing a rule based webpage analyzer very hard. In the rest of this section, we present trainable methods to segment and assign class labels to segments of a HTML page.

Let an HTML page $P_n$ with T text nodes be represented as two sets of vectors:

$$P_n = \{D_n, L_n\}$$

$$D_n = \{d_1^{(n)}, \ldots d_t^{(n)} \ldots, d_{(T-1)}^{(n)}\}$$

$$L_n = \{l_{(i,j)}^{(n)}\}$$

Where $d_t^{(n)}$ is the difference-vector between the t'th and the (t+1)'th text node, $l_{(i,j)}$ is the description vector for the text nodes from i to j. For training pages, each (i,j) corresponds to a labeled information block. And $d_j^{(n)}$ is an information boundary. For test pages, these boundaries need to be identified first.

An HTML page is then encoded as a sequence of feature vectors. In our experiments, a difference-vector $d_t^{(n)}$ consists of 189 real value elements and consists of parameters shown in Table 2. A description vector $l_{(i,j)}$ is represented as a 277-dimensional vector and involves parameters listed in Table 3.

TABLE 2

Parameters for difference vectors

| Parameter | Dim | Explanation | Example: $d_1$ in Table 1 |
|---|---|---|---|
| Tags_I | 91 | All non-text tags between two consecutive text-nodes | (0, . . . input = 2, 0 . . . ) |
| Tags_d | 91 | Difference between tags and parent tags of two consecutive nodes | (a = 1, 0 . . . span = 1, 0 . . . strong = 1, 0 . . . ) |
| Position_d | 2 | Difference between positions of two consecutive nodes | (0, 3) |
| Node_I | 1 | the number of non text-nodes between two consecutive text nodes | (2) |
| Size_d | 1 | Difference between the size of two consecutive nodes | (3, 3) |
| Color_d | 2 | Binary comparison between the color of two consecutive nodes | (0, 0) |
| Code_d | 1 | Distance between the codes of two consecutive nodes | (1) |

In terms of data preparation, during testing of the present invention, one hundred pages were randomly chosen from XYZ website (www.xyz.com/) Eighty of them were treated as training data; the rest twenty pages constituted the test data. All text nodes of all these pages are labeled as "start end WIC". For example, "0.4 prompt" means five text nodes from the first to the fifth form a prompt area for an input field. "0" and "4" are physical order numbers of text nodes. All these pages are annotated manually and the detailed number of examples for each class is listed in Table 4.

TABLE 3

Parameters for description vectors

| Parameter | Dim | Explanation | example: $I_{(0, 4)}$ of Table-1 |
|---|---|---|---|
| Tags | 91 | percent of the frequency of each tag relative to the number of nodes from i to j | (a = 2/5, 0, . . . p = 1, 0 . . . span = 1, s strong = 0.8, 0) |
| Tags_W | 91 | percent of the words under each tag relative to all words from i to j | (a = 0.57, 0, . . . p = 1, 0 . . . , 0, span = 1, strong = 0.86, 0 . . . ) |
| Tags_R | 91 | frequency of each nontext node tag from j to j + 1 | (a = 0, . . . input = 2, 0 . . . ) |
| Size | 1 | Average size of all text nodes from i to j | (3.6) |
| Table_Pos | 1 | the relative position of the table that the information block (i, j) lies in | (0.0%) |
| Pre-words | 1 | percent of words before (i, j) relative to all words in the page | (0.0%) |
| Word_Len | 1 | The number of words from l to j | (7) |

TABLE 4

Frequency of information types

| Type | Frequency | Type | Frequency |
|---|---|---|---|
| explanation | 423 | Option | 24 |
| topic | 381 | table-data area | 23 |
| menu | 271 | Headline | 9 |
| short passage | 243 | Information garbage | 8 |

TABLE 4-continued

Frequency of information types

| Type | Frequency | Type | Frequency |
|---|---|---|---|
| list | 101 | Prompt | 214 |

In terms of boundary detection, for finding the boundaries between IUs on a webpage, the inventors ran a binary IR classifier, which takes training $d_t$ as indexed documents and test $d_t^{(m)}$ as queries, and a binary SVM classifier to classify difference vectors. In the learning stage, $d_t$ is assigned '1', when there's a boundary between the t'th and the (t+1)'th node. Otherwise $d_t$ is assigned '-1'. The classifier C is trained from these vectors.

In the testing stage, given a test HTML page represented as $P_m$ and its difference vectors $\{d_t^{(m)}\}$, $d_t^{(m)}$ is identified as a boundary if $C(d_t^{(m)})=1$. Table 5 shows a comparative study of feature selection for boundary detection and shows the performances of two classifiers. The contribution of the feature sets (P1, P2, P3) could be evidently observed. SVM achieves better performance than IR classifier.

TABLE 5

The performance of boundary detection
(where: P1 = [Tags_l], P2 = [Tags_d], P3 = [Position_d, Node_l, Size_d, Color_d, Code_d])

| Parameters | | P1 | P1, P2 | P1, P2, P3 |
|---|---|---|---|---|
| Hit Rate | IR-C | 19.67% | 48.7% | 59.01% |
| | SVM | 28.7% | 61.9% | 70.1% |
| False Alarm Rate | IR-C | 1.23% | 1.23% | 1.63% |
| | SVM | 0.33% | 0.68% | 0.78% |

In terms of information classification, an example of classifying information blocks to information types (or Symbols) is listed in Table 4. First an empty vector set is set for each information type, $C_1$ corresponds to "explanation", accordingly $C_{10}$ corresponds to 'prompt'. In the learning stage, all description-vectors ($l_{(i,j)}^{(n)}$) of training pages are collected into its corresponding vector set $C_c$ as the labeling file indicates. The method further comprises computing the average vector for each class and adding it to the associated vector set. For a test stage, each of its information blocks $l_{(i,j)}$ is assigned to an information type $c_{(i,j)}$ which is considered as the closest one to $l_{(i,j)}$ according to the distance $F(l_{(i,j)}, C_c)$ The formulas below:

$$c_{(i,j)} = \arg\min_c \{F(l_{(i,j)}, C_c)\} \tag{1}$$

$$F(l_{(i,j)}, C_c) = \min_{(it,jt)}\left(1 - \frac{\langle l_{(it,jt)} \cdot l_{(i,j)} \rangle}{\|l_{(it,jt)}\| \cdot \|l_{(i,j)}\|}\right) \tag{2}$$

$$l_{(i,j)} = \begin{cases} 1 + \log(l_{(i,j)}) \ldots l_{(i,j)} > 0 \\ 0 \ldots l_{(i,j)} = 0 \end{cases} \tag{3}$$

In both the training stage and the testing stage, all elements of $1_{(i,j)}$ are converted to a log value using formula (3). This conversion intends to bring the variety of elements to be in similar range. Table 6 give the accuracy of information classification in two conditions: knowing the boundaries and not knowing the boundaries.

TABLE 6

Performance of information classification

| Parameters | Boundaries labeled correctly | Not Knowing the boundary |
|---|---|---|
| Accuracy | 74.6% | 66.2% |

This result means if the boundaries are given correctly, 74.6% of information blocks can be correctly assigned an information class symbol. When combining boundary detection with information classification into one process, 66.2% of information blocks can be correctly recognized.

This disclosure describes WebTalk, a general framework for automatically building spoken dialog services from a given website. This framework will enable companies, which have already set up their websites, to extend their customer service with a spoken dialog interface either over the phone or through the Internet. In order to conquer the challenges confronting WebTalk, a variety of techniques have been integrated into this system, including information retrieval, entity extraction, morphological knowledge, semantic knowledge (synonyms, etc.), language modeling, pos-tagging, summarization, automatic document analysis, and prevalent dialog technologies.

The basic idea is to explore the physical structure and the hyperlinks on a given website, which are defined by web page creators and assumed to convey relationship between pages and comprehensive task knowledge. Secondly, a feature vector is proposed for representation approach for HTML documents and applied IR and SVM to segment web pages and classify information.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention is discussed with reference to company websites. However, other structured databases may also be analyzed and dialog interfaces automatically developed for those databases. Such databases may include company intranets or internal corporate databases. Any database having a structure similar to a website structure that can be analyzed using the website analyzer or an equivalent component may be used with the present invention. In this regard, the term website can refer in a general way to a standard website or to any structured database that exhibits similar structure. Accordingly, the appended claims and their legal equivalents should only define the invention, rather than any specific examples given.

We claim:

1. A system for generating data for use in a spoken dialog service, the system comprising:
   a module configured to convert data from a structured database to a structured text data set and a structured task knowledge base for use by at least one of a plurality of spoken dialog service components;
   a module configured to extract linguistic items from the structured database for use by at least one of the plurality of spoken dialog service components; and
   a module configured to automatically generate a spoken dialog service by training each of the plurality of spoken dialog service components using at least one of the structured text data, the structured task knowledge base or the linguistic items.

2. The system of claim 1, wherein the structured text data set and the structured task knowledge base are used by a language understanding module, a language generation module and a dialog manager module spoken dialog service components.

3. The system of claim 1, where the linguistic items from the data are used for building a language model used for training an automatic speech recognition module.

4. The system of claim 3, wherein the linguistic items comprise named-entities.

5. The system of claim 4, wherein the structured text data further comprises nominal, verbal and adjectival phrases.

6. The system of claim 1, wherein the structured text data comprises a hierarchical tree.

7. The system of claim 6, wherein the hierarchical tree comprises a plurality of non-leaf tree nodes having a node alias that is human understandable.

8. The system of claim 7, wherein each non-leaf tree node further comprises a verbose description document and a concise summary.

9. The system of claim 8, wherein the verbose description document and concise summary are used for information matching and help prompt construction during dialog execution.

10. The system of claim 6, wherein the hierarchical tree further comprises at least one leaf node corresponding to a webpage.

11. The system of claim 10, wherein each leaf node further contains a list of information units associated with the webpage.

12. The system of claim 11, wherein the list of information units further comprises product and service names, product descriptions and service definitions.

13. The system of claim 12, wherein the list of information units further comprises explanations of acronyms and frequently asked questions.

14. A spoken dialog interface to the website, generated according to a method comprising:
- encoding each webpage in a website as a sequence of feature vectors;
- detecting boundaries between information units on each webpage; and
- classifying information blocks organized according to the detected boundaries between information units into information class symbols, wherein the classified information blocks are utilized for generating a spoken dialog interface to the website.

15. The spoken dialog interface of claim 14, wherein the step of detecting boundaries is performed using one of a binary information retrieval classifier or a binary support vector machine classifier.

16. A computer-readable medium storing instructions for controlling a computing device to generate a spoken dialog interface, the instructions comprising:
- encoding each webpage in a website as a sequence of feature vectors;
- detecting boundaries between information units on each webpage; and
- classifying information blocks organized according to the detected boundaries between information units into information class symbols, wherein the classified information blocks are utilized for generating a spoken dialog interface to the website.

17. The computer-readable medium of claim 16, wherein the step of detecting boundaries is performed using on of a binary information retrieval classifier or a binary support vector machine classifier.

* * * * *